United States Patent
Zhao et al.

(10) Patent No.: US 9,094,462 B2
(45) Date of Patent: Jul. 28, 2015

(54) SIMULTANEOUS PACKET DATA NETWORK (PDN) ACCESS

(75) Inventors: Suli Zhao, San Diego, CA (US); Srinivasan Balasubramanian, San Diego, CA (US); Ajith T. Payyappilly, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 342 days.

(21) Appl. No.: 13/182,236

(22) Filed: Jul. 13, 2011

(65) Prior Publication Data

US 2013/0016668 A1 Jan. 17, 2013

(51) Int. Cl.
  H04W 4/00 (2009.01)
  H04L 29/12 (2006.01)
  H04L 29/06 (2006.01)
  H04L 29/08 (2006.01)

(52) U.S. Cl.
  CPC ........ H04L 61/2517 (2013.01); H04L 61/2514 (2013.01); H04L 69/161 (2013.01); H04L 69/326 (2013.01); H04L 61/2575 (2013.01); H04L 61/2585 (2013.01)

(58) Field of Classification Search
  USPC ........................................... 370/329, 395.52
  See application file for complete search history.

(56) References Cited

U.S. PATENT DOCUMENTS

| | | | |
|---|---|---|---|
| 6,549,538 B1 * | 4/2003 | Beck et al. | 370/395.52 |
| 6,978,141 B2 * | 12/2005 | Smith et al. | 455/445 |
| 6,985,479 B2 | 1/2006 | Leung et al. | |
| 7,319,874 B2 * | 1/2008 | Rautiola et al. | 455/455 |
| 7,551,590 B2 * | 6/2009 | Haller et al. | 370/338 |
| 8,208,944 B2 * | 6/2012 | Kim et al. | 455/456.1 |
| 8,274,917 B1 * | 9/2012 | Bowman et al. | 370/254 |
| 8,363,584 B2 * | 1/2013 | Yang et al. | 370/312 |
| 8,547,912 B1 * | 10/2013 | Breau et al. | 370/329 |
| 2003/0051052 A1 * | 3/2003 | Shteyn et al. | 709/245 |
| 2006/0034296 A1 * | 2/2006 | Talucci | 370/395.52 |
| 2006/0239266 A1 * | 10/2006 | Babbar et al. | 370/392 |
| 2007/0153812 A1 * | 7/2007 | Kemp | 370/401 |
| 2009/0213794 A1 | 8/2009 | Rosten | |
| 2009/0222842 A1 * | 9/2009 | Narayanan et al. | 719/328 |
| 2010/0014459 A1 * | 1/2010 | Mir et al. | 370/328 |
| 2010/0070972 A1 | 3/2010 | Kumagai et al. | |
| 2010/0229175 A1 * | 9/2010 | Gonzalez et al. | 718/104 |
| 2011/0019588 A1 | 1/2011 | Boucadair | |
| 2012/0243521 A1 * | 9/2012 | Zhang | 370/338 |

FOREIGN PATENT DOCUMENTS

JP 2011517201 A 5/2011
WO WO-2009125158 A2 10/2009

(Continued)

OTHER PUBLICATIONS

International Search Report and Written Opinion—PCT/US2011/044075—ISA/EPO—Jun. 13, 2012.

(Continued)

*Primary Examiner* — Michael J Moore, Jr.

(74) *Attorney, Agent, or Firm* — Patterson & Sheridan, L.L.P.

(57) ABSTRACT

Certain aspects of the present disclosure provide techniques for wireless communications, wherein distinct port partitions are assigned to processing entities on a user equipment device. Doing so provides the processing entities with concurrent access to the single PDN connection.

28 Claims, 8 Drawing Sheets

(56) References Cited

FOREIGN PATENT DOCUMENTS

| WO | WO-2010008819 A1 | 1/2010 |
| WO | WO-2010123757 A1 | 10/2010 |

OTHER PUBLICATIONS

Gong Su, et al., "Mobile Communication with Virtual Network Address Translation," Technical Report CUCS-003-02, Department of Computer Science, Columbia University, Feb. 2002, 14 pgs.

Boucadair M et al: "Anticipate IPv4 Address Exhaustion: A Critical Challenge for Internet Survival", Evolving Internet, 2009. Internet '09. First International Conference on, IEEE, Piscataway, NJ, USA, Aug. 23, 2009, pp. 27-32, XP031540612, ISBN: 978-1-4244-4718-3.

Bush Internet Initiative Japan O Maennel Deutsche Telekom Laboratories J Zorz GO6 SI S Bellovin Columbia University L Cittadini UN: "The A+P Approach to the IPv4 Address Shortage; draft-ymbk-aplusp-03.txt", The A+P Approach to the IPV4 Address Shortage; Draft-YMBK-APLUSP-03.TXT, Internet Engineering Task Force, IETF; Standardworkingdraft, Internet Society (ISOC) 4, Rue Des Falaises CH—1205 Geneva, Switzerland, No. 3, Mar. 9, 2009, XP015061905.

Gabor Bajko Teemu Savolainen Nokia M Boucadair P Levis France Telecom: "Port Restricted IP Address Assignment; draft-bajko-pripaddrassign-03. txt", Port Restricted IP Address Assignment; Draft-Bajko-Pripaddrassign-03 .TXT Internet Engineering Task Force, IETF; Standardworkingdraft, Internet Society (ISOC) 4, Rue Des Falaises CH—1205 Geneva, Switzerland, No. 3, Sep. 28, 2010, pp. 1-19, XP015071355, [retrieved on Sep. 28, 2010].

Partial International Search Report—PCT/US2011/044075—ISA/EPO—Mar. 20, 2012.

\* cited by examiner

SIMULTANEOUS PACKET DATA NETWORK (PDN) ACCESS

BACKGROUND

I. Field

The present disclosure generally relates to wireless communications and, more particularly, to sharing of an IP address for a packet data network (PDN) connection among multiple processing entities on a wireless terminal.

II. Background

Wireless communication systems are widely deployed to provide various types of communication content such as voice, data, and so on. These systems may be multiple-access systems capable of supporting communications with multiple users by sharing the available system resources (e.g., bandwidth and transmit power). Examples of such multiple-access systems include Code Division Multiple Access (CDMA) systems, Time Division Multiple Access (TDMA) systems, Frequency Division Multiple Access (FDMA) systems, 3rd Generation Partnership Project (3GPP) Long Term Evolution (LTE) systems and Orthogonal Frequency Division Multiple Access (OFDMA) systems.

Generally, a wireless multiple-access communication system can simultaneously support communications for multiple wireless terminals. Each terminal communicates with one or more base stations via transmissions on the forward and reverse links. The forward link (or downlink) refers to the communication link from the base stations to the terminals, and the reverse link (or uplink) refers to the communication link from the terminals to the base stations. This communication link may be established via a single-input single-output, multiple-input single-output or a multiple-input multiple-output (MIMO) system.

In addition to carrying audio transmissions, one use of a wireless terminal is to send and receive data carried via a packet data network (PDN). Generally, an Access Point Name (APN) is used to identify an PDN for a mobile data user to communicate with. In addition to identifying the PDN, the APN may also be used to define the type of service. Examples of such connection-based services include a connection to wireless application protocol (WAP) server, messaging services (MMS), or an IMS service (e.g., VoIP, video telephony or text messaging) provided by a particular PDN. An APN is used in 3GPP data access networks, e.g. general packet radio service (GPRS), evolved packet core (EPC).

Typically, a wireless terminal is assigned an IP address to use for data packets sent to/from the wireless terminal via the PDN connection. In some cases, however, the wireless terminal may include multiple processing entities, e.g., a modem processor and an application processor, each of which may execute applications which request network connections over the PDN via an independent transport control protocol/Internet protocol (TCP/IP) stack. Further, the wireless terminal may itself share the PDN connection with other devices (commonly referred to as tethering). In such cases, applications running on different IP stacks may need concurrent access to the same PDN connection.

SUMMARY

Embodiments presented in this disclosure provide techniques for supporting simultaneous access to a packet data network (PDN) accessed from multiple network layer end-points on a mobile device. The mobile device may include multiple processing entities, such as a modem processor and an application processor, that need to access the same PDN. However, a carrier may assign a single Internet protocol (IP) address to the mobile device to use in accessing the PDN. In order to share the assigned network address, in one embodiment, the mobile device assigns a non-overlapping port range to each processing entity. In such an embodiment, when an application on one of the processing entities requests to establish network connection to the PDN, a port value is selected from the non-overlapping range assigned to that processing entity. Similarly, when the mobile device receives network packets addressed to the assigned IP address, a port value in the network packet is used to determine what network layer end-point the packet should be forwarded to.

In an alternative embodiment, when one of the processing entities establishes a network connection to the PDN, the port value selected for that network connection is added to a blacklist of port values maintained by the other processing entities.

In still another embodiment, a network translation (NAT) module may be implemented on one of the processing entities. In such a case, the external interface of the NAT module may be assigned a port range that does not overlap with the port ranges assigned to the processing entities. One variation of this embodiment includes a mobile device that includes both a single processing entity and a NAT module. In this case, the NAT module and the processing entity may be assigned non-overlapping port ranges to use for network connections to the PDN.

DETAILED DESCRIPTION

Figure 1:
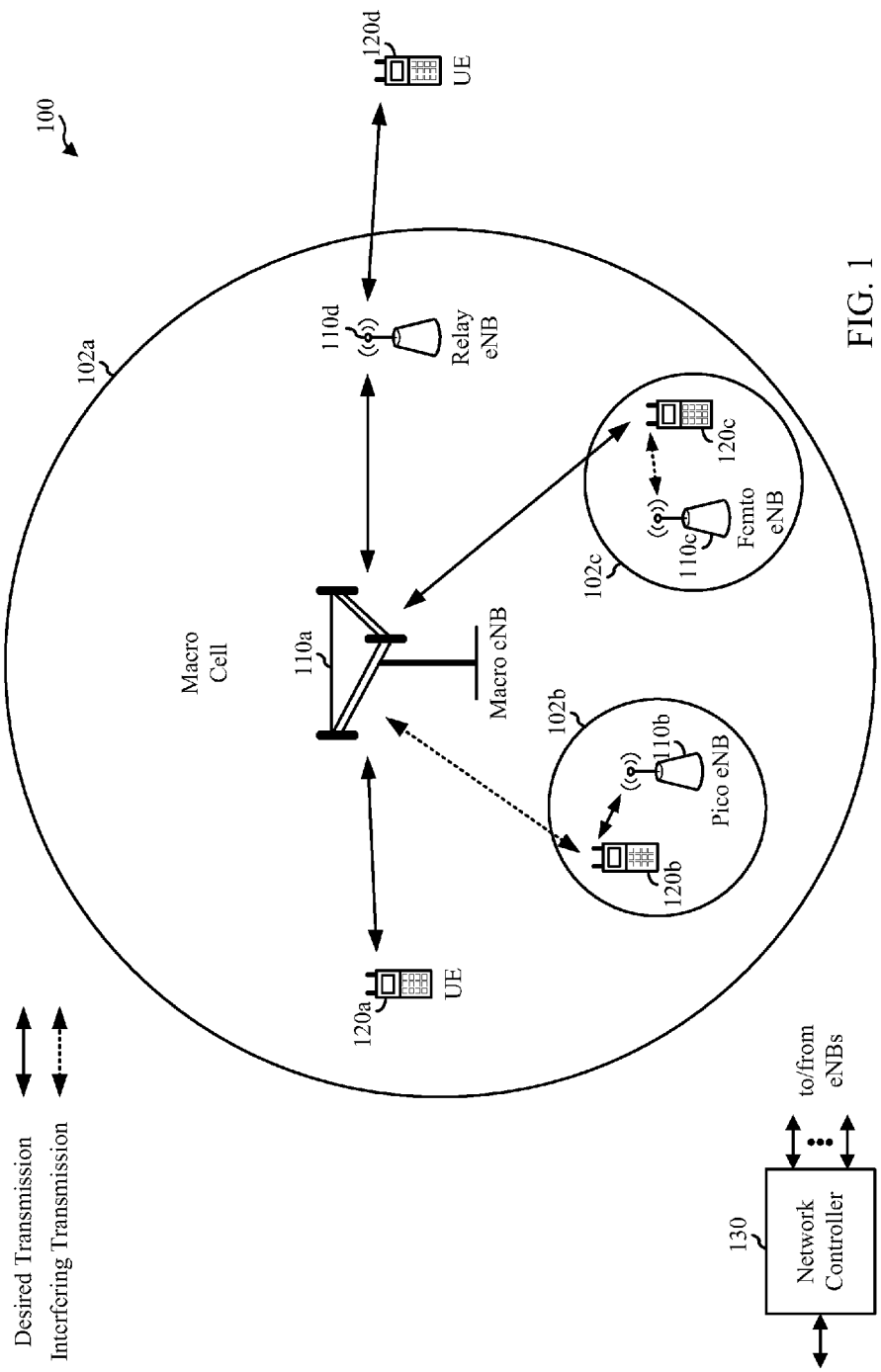
FIG. 1 shows a wireless communication network.

Certain aspects of the present disclosure provide a method for sharing an IP address for a packet data network (PDN) among multiple processing entities on user equipment (UE), such as a mobile device. That is, aspects of the present disclosure allow multiple applications/services running on different processors on UE to simultaneously access a single PDN. The applications connecting to the PDN may be embedded applications and/or tethered applications and may share the same Internet protocol (IP) address assigned by a PDN gateway, which assign either Internet protocol version 4 (IPv4) or Internet protocol version 6 (IPv6) addresses.

In one embodiment, applications that connect to the same PDN (and share the same IP address) do so by connecting to the same Um Iface, which provides software on the UE configured to provide data services from the radio technology for a specific data protocol stack, e.g. the point-to-point protocol and hop distance based routing protocols for CDMA2000 and the LTE protocols for Evolved Universal Terrestrial Radio Access (E-UTRA). Any tethered devices connected to the same PDN also do so by connecting to the Um Iface on the UE. In one embodiment, port partitioning is used to create non-overlapping ranges of port values for multiple processing entries on the UE (e.g., between a modem processor and an application processor). The UM Iface forwards traffic to the IP stack of a given processor based on the port values in a given packet. As described in greater details below, the port partition can be static or dynamic.

Further, in certain embodiments, a Network Address Translation (NAT) module may be used to provide private IP addresses to the applications running on any tethered devices (as described in RFC 1631). If present, the NAT module may be assigned a distinct range of ports (relative to the ranges assigned to other processing entities) to use to forward data packets to/from the PDN and private addresses behind the NAT module.

In one embodiment, the processing entities are each assigned a distinct range of ports to use for network connections to the PDN established by applications running on a given processing entity. Doing so allows the processing entities to access the single PDN connection concurrently. For example, a Bearer independent protocol (BIP) application running on a Universal Integrated Circuit Card (UICC)/Modem processor may use an administrative PDN connection to provision or configure a Subscriber Identity Module (SIM) card on the UE and an Over the Air Device Management (OTADM) client running on an application processor may simultaneously access the administrative PDN to provision or configure other aspects of the UE. Similarly, an File Transfer Protocol (FTP) client running on a tethered Personal Computer (PC) and a web browser application running on an application processor on the UE may simultaneously access an Internet PDN. Another example of concurrent PDN access includes an IP Multimedia Subsystem (IMS) client (e.g., a VoIP client) running on a modem processor and a location/positioning application running on application processor, where both applications simultaneously access an IMS PDN.

In different embodiments, depending on the configuration of the UE, the NAT module may run on either the modem processor or application processor of the UE. Further, in one embodiment, the hybrid solution of using both port partitioning between multiple processing entities and the NAT module may be simplified to include a static port partition between two (or more) processing entities (without the NAT module) or simplified to include a single processing entity (e.g., the modem processor) and the NAT module. A port partition generally refers to a non-overlapping range of port values assigned to each processing entity. More specifically, each processing entity receives a distinct range of port values to use to establish network connections with the PDN. Each of these variations for providing multiple processing entities on a UE with concurrent access to a PDN is described in more details below.

The techniques described herein may be used for various wireless communication networks such as CDMA, TDMA, FDMA, OFDMA, SC-FDMA and other networks. The terms "network" and "system" are often used interchangeably. A CDMA network may implement a radio technology such as Universal Terrestrial Radio Access (UTRA), cdma2000, etc. UTRA includes Wideband CDMA (WCDMA), Time Division Synchronous CDMA (TD-SCDMA), and other variants of CDMA. cdma2000 covers IS-2000, IS-95 and IS-856 standards. A TDMA network may implement a radio technology such as Global System for Mobile Communications (GSM). An OFDMA network may implement a radio technology such as Evolved UTRA (E-UTRA), Ultra Mobile Broadband (UMB), IEEE 802.11 (Wi-Fi), IEEE 802.16 (WiMAX), IEEE 802.20, Flash-OFDM®, etc. UTRA and E-UTRA are part of Universal Mobile Telecommunication System (UMTS). 3GPP Long Term Evolution (LTE) and LTE-Advanced (LTE-A), in both frequency division duplexing (FDD) and time division duplexing (TDD), are new releases of UMTS that use E-UTRA, which employs OFDMA on the downlink and SC-FDMA on the uplink. UTRA, E-UTRA, UMTS, LTE, LTE-A and GSM are described in documents from an organization named "3rd Generation Partnership Project" (3GPP). CDMA 2000 and UMB are described in documents from an organization named "3rd Generation Partnership Project 2" (3GPP2). The techniques described herein may be used for the wireless networks and radio technologies mentioned above as well as other wireless networks and radio technologies. For clarity, certain aspects of the techniques are described below for LTE, and LTE terminology is used in much of the description below. It should be noted that the descriptions are also applicable to other technologies with different terminologies.

FIG. 1 shows a wireless communication network 100, which may be an LTE network or some other wireless network. Wireless network 100 may include a number of evolved Node Bs (eNBs) 110 and other network entities. An eNB is an entity that communicates with UEs and may also be referred to as a base station, a Node B, an access point, etc. Each eNB may provide communication coverage for a particular geographic area. In 3GPP, the term "cell" can refer to a coverage area of an eNB and/or an eNB subsystem serving this coverage area, depending on the context in which the term is used.

An eNB may provide communication coverage for a macro cell, a pico cell, a femto cell, and/or other types of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a Closed Subscriber Group (CSG)). An eNB for a macro cell may be referred to as a macro eNB. An eNB for a pico cell may be referred to as a pico eNB. An eNB for a femto cell may be referred to as a femto eNB or a home eNB (HeNB). In the example shown in FIG. 1, an eNB 110a may be a macro eNB for a macro cell 102a, an eNB 110b may be a pico eNB for a pico cell 102b, and an eNB 110c may be a femto eNB for a femto cell 102c. An eNB may support one or multiple (e.g., three) cells. The terms "eNB", "base station" and "cell" may be used interchangeably herein.

Wireless network 100 may also include relay stations. A relay station is an entity that can receive a transmission of data from an upstream station (e.g., an eNB or a UE) and send a transmission of the data to a downstream station (e.g., a UE or an eNB). A relay station may also be a UE that can relay transmissions for other UEs. In the example shown in FIG. 1, a relay station 110d may communicate with macro eNB 110a and a UE 120d in order to facilitate communication between eNB 110a and UE 120d. A relay station may also be referred to as a relay eNB, a relay base station, a relay, etc.

Wireless network 100 may be a heterogeneous network that includes eNBs of different types, e.g., macro eNBs, pico eNBs, femto eNBs, relay eNBs, etc. These different types of eNBs may have different transmit power levels, different coverage areas, and different impact on interference in wireless network 100. For example, macro eNBs may have a high transmit power level (e.g., 5 to 40 Watts) whereas pico eNBs, femto eNBs, and relay eNBs may have lower transmit power levels (e.g., 0.1 to 2 Watts).

A network controller 130 may couple to a set of eNBs and may provide coordination and control for these eNBs. Network controller 130 may communicate with the eNBs via a backhaul. The eNBs may also communicate with one another, e.g., directly or indirectly via a wireless or wireline backhaul.

UEs 120 may be dispersed throughout wireless network 100, and each UE may be stationary or mobile. A UE may also be referred to as a terminal, a mobile station, a subscriber unit, a station, etc. A UE may be a cellular phone, a personal digital assistant (PDA), a wireless modem, a wireless communication device, a handheld device, a laptop computer, a cordless phone, a wireless local loop (WLL) station, a smart phone, a netbook, a smartbook, etc.

FIGS. 2A-2D provide functional block diagrams illustrating embodiments for processing entities on a mobile device to share an IP address assigned to a PDN connection. Note, however, the functional block diagrams shown in FIGS. 2A-2D are simplified to highlight aspects of the present invention and a UE may include a variety of other interconnected components, modules, etc.

Figure 2A:
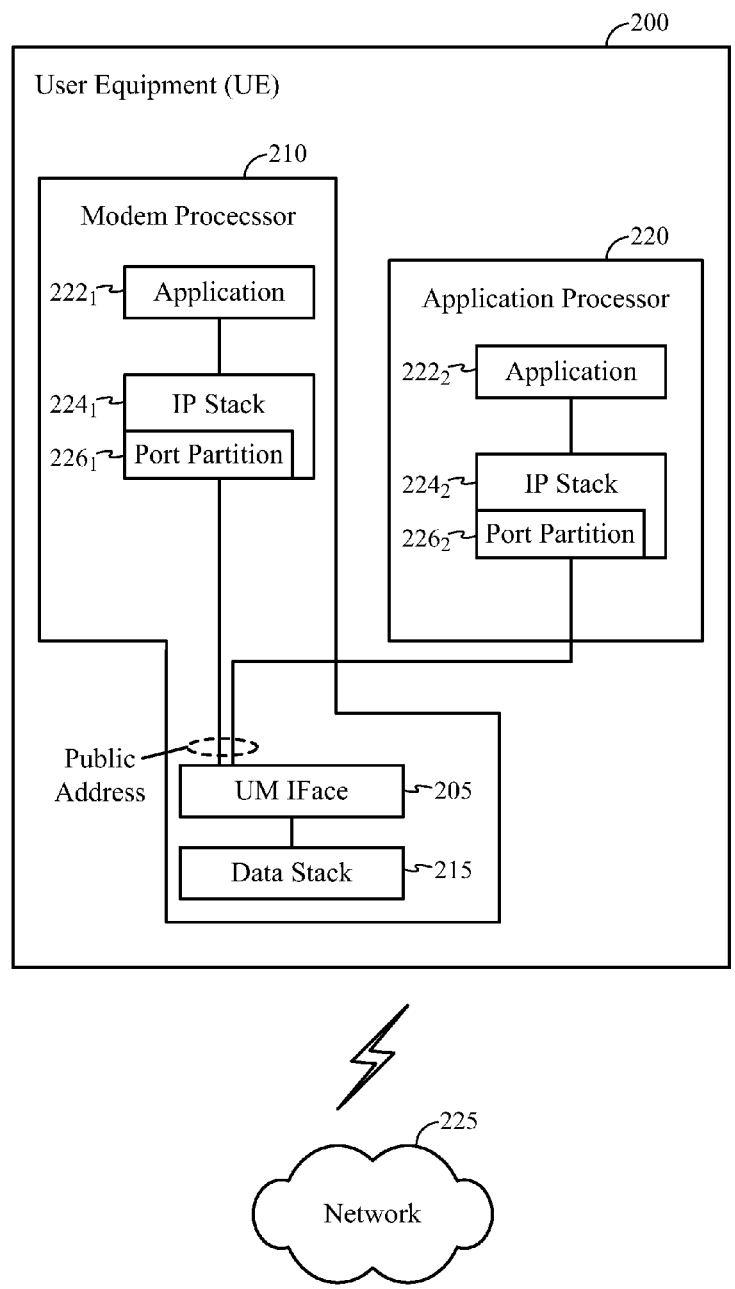
FIGS. 2A-2D show block diagrams highlighting aspects of mobile device configurations that facilitate concurrent packet data network access by multiple processing entities on the mobile device, according to certain aspects of the disclosure.

First, FIG. 2A shows a block diagram of UE 200 which includes both a modem processor 210 and an application processor 220, as well as a UM Iface 205 and a data stack 215. In this embodiment, the UM Iface 206 provides a software component or module configured to provide data services from the radio technology for a specific data protocol stack. For example, the UM Iface 206 may provide data link layer type services to different processors on the UE 200. Additionally, the UM Iface 205 may be configured to establish and/or manage a PDN connection to networks 225. In this embodiment, a UM Iface 205 is instantiated for each PDN connection. For example, a UM Iface 205 may be instantiated to establish a PDN connection for an administrative network (as requested by applications $222_{1\text{-}2}$), which provides access to one set of applications/services, such as provisioning and configuration. Additional UM Ifaces 205 may be instantiated to establish PDN connections with an Internet network, which provides a network for general IP traffic, and for an IMS network, which provides access to IMS applications/services (e.g., VoIP traffic). Further, a given carrier could offer access to specific services/applications through a dedicated PDN. Of course, the actual PDN connections may vary in a particular case. Data stack 215 provides a software component configured to store, send, and receive data over the physical interfaces of the UE 200 for PDN connections to PDN networks 225.

As shown, the modem processor 210 is executing an application $222_1$ and application processor 220 is executing an application $222_2$. By way of illustration, the modem processor 210 may provide a processor configured to execute one (or more) applications $222_1$ related to the operation of the UE 200. For example, application $222_1$ may be a BIP application used to configure aspects of a SIM card on UE 200 which requires sending/receiving data packets to an administrative PDN. Similarly, the application processor 220 may provide a processor configured to execute application $222_2$, also used to configure or provision the UE 200, e.g., an OTADM client which also sends/receives data packets to/from the administrative PDN. In such a case, both applications $222_1$ and $222_2$ request network connections to the administrative PDN. Different applications $222_1$ and $222_2$ may similarly require concurrent access to other PDNs (e.g., applications connecting to an Internet PDN or applications connecting to an IMS PDN).

In this embodiment, the UE 200 addresses the need for concurrent access to a given PDN by assigning a port partition $226_1$ to an IP stack $224_1$ on the modem processor 210 and a port partition $226_2$ to an IP stack $224_2$ on the application processor 220. Each port partition may indicate a range of port values available to use for connections to a PDN established by the applications $222_{1\text{-}2}$. Further, the range of port values in each port partition does not overlap with the range of port values in the other partitions. That is, each port partition provides a distinct, non-overlapping range of port values for use by the modem processor 210 or application processors 220. Doing so allows the applications $222_{1\text{-}2}$ on the modem processor 210 and application processor 220 to concurrently establish network connections to a given PDN connection assigned a single IP address, where the connections are distinguished by the port values.

As shown in FIG. 2A, upon request by one of the application 222, the modem processor 210 or application processor 220 selects a port number that has not been used by any applications connecting to the same PDN and using the same IP address. In different embodiments, the port partitions $226_{1\text{-}2}$ may be created statically or dynamically. For the static port space partitioning embodiment, the available port space is partitioned into non-overlapping ranges and assigned to different processors (e.g., processors 210 and 220). In such a case, when the applications $222_{1\text{-}2}$ request a PDN connection, the processor on which the application 222 is running selects a port from the specific range assigned to that processor. For the dynamic port partitioning embodiment, each processor (e.g., processors 210 and 220) maintains a Forbidden Port List (FPL). Each time one processor selects a port number, it communicates the selected port number to the other processor, which adds that port number to its FPL, effectively building a blacklist of ports on each processor. Note, while the dynamic approach can achieve the same effect as the static approach, it also requires inter-processor communications each time a port number is assigned to an application.

Operating systems running on the modem processor 210 and the application processor 220 each of have the capability of selecting port numbers to assign to network connections requested by the applications $222_{1\text{-}2}$. As described, such port numbers may be selected from the non-overlapping range assigned to the respective processor 210, 220 (or selected so as not to collide with an FPL). For example, when application $222_1$ requests a network connection, the port value used to establish a socket is selected from range specified by the port partition $226_1$. Similarly, when application $222_2$ requests a network connection, the port value used to establish a socket is selected from range specified by the port partition $226_2$.

For inbound traffic, when network packets addressed to the public IP address assigned to a given PDN connection are received by the UM Iface 205, the Um Iface 205 may evaluate the port value present in a transport header of a given packet to determine whether to forward the packets to IP stack $224_1$ or IP stack $224_2$.

As noted above, in another embodiment, the UE 200 may also share a PDN connection with connected devices, e.g., a laptop "tethered" over an 802.11 wireless connection to an Internet PDN. For such an embodiment, port partitioning may not alone provide concurrent access to the Internet PDN for applications $222_{1\text{-}2}$ on the modem processor 210, the application processor 220, and for one or more connected devices, as the UE 200 may lack the capability to control port selection for network connections established by such connected devices.

Figure 2B:
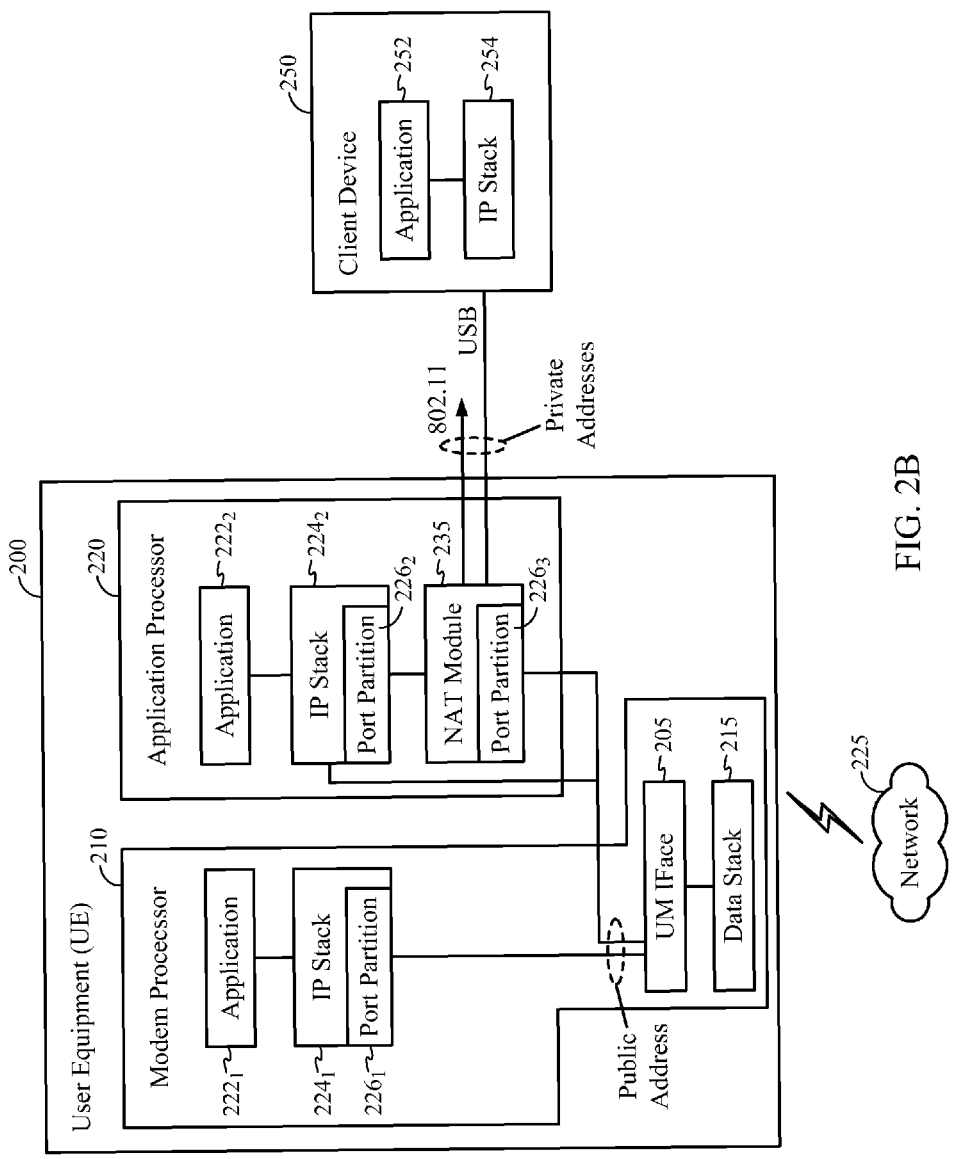

In these scenarios, a hybrid solution is used to provide multiple processing entities with concurrent access to a given PDN. More specially, in these scenarios, NAT based approaches can be used in conjunction with port partitioning. For example, FIG. 2B shows a functional block diagram of UE 200 which includes the modem processor 210 and the application processor 220, described above relative to FIG. 2A. In the embodiment shown in FIG. 2B, however, the application processor 220 also includes a NAT module 235, used as a front-end interface for one or more client devices 250. The client device 250 may be a laptop or desktop computer, but may also be any other network capable devices (e.g., tablet computers, game consoles, and other "network-aware" consumer electronic devices).

As is known, network address translation (or NAT) is the translation of an IP address used within one network to a different IP address known within another network. One network is typically designated the inside (or private) network and the other is the outside (or public) network. In context of the present disclosure, the outside network generally refers to an IP address assigned to a given PDN (and shared by the modem processor 210 and application processor 220). And the inside address refers to IP addresses assigned by the NAT module 235 to connected devices (e.g., client device 250).

The NAT module 235 assigns a private IP address to the IP stack 254 on the client device 250. For example, assume the UE 200 provides Wi-Fi access to client device 250 through an 802.11 interface. In such a case, the NAT module 235 assigns private IP addresses to connected Wi-Fi clients, and application 252 on the client device 250 send/receive network packets using the private address assigned to IP stack 254. The public IP address is used by applications $222_{1\text{-}2}$ running on the modem processor 210 and the application processor 220, as well as on the external interface of the NAT module 235.

Further, the embodiment of FIG. 2B, the NAT module 235 includes a port partition $226_3$. Like the port partitions $226_{1\text{-}2}$, the port partition $226_3$ provides a range of port values to use for network connections initiated by the NAT module 235 (on behalf of connected client device 250) that does not overlap with any of the port values in port partitions $226_{1\text{-}2}$. The NAT module 235 uses the ports identified in partition $226_3$ for network connections between the NAT module 235 and a given PDN connection. Thus, the NAT module 235, application $222_1$, and application $222_2$ may concurrently access a given PDN. The network connections created by applications $222_{1\text{-}2}$ and NAT module 235 each use a port value selected from a respective port partition $226_{1\text{-}3}$. Alternatively, if port values are selected dynamically, then each port selected for a network connection by applications $222_{1\text{-}2}$ and NAT module 235 is added to the FPL of the other processing entities on the UE 200.

In one embodiment, the application processor 220 assigns port numbers to the external interface on NAT module 235 as a subset of the port partition $226_2$ and ensures that no conflict with the applications running on the modem processor 210 or the application processor 220 occur. Alternatively, the port partitions $226_2$ and $226_3$ may be assigned by the UE 200 as distinct ranges.

For the applications 252 running on the client device 250 (and connecting to the same PDN), the NAT module 235 maps an assigned private IP address and port pair to the same public IP address, but with different port numbers for each connection. The port numbers may be selected from the port partition $226_2$. In particular, the NAT module 235 may maintain an address translation table and create an entry for each IP connection, indexed by IP address and port of the other end point of the IP connectivity. For uplink packets, the NAT module 235 translates a local IP address and port pair to the public IP address and port pair. For downlink packets, the NAT module 235 translates the public destination (IP address and port) to the corresponding local destination (IP address and port).

In addition, the NAT module 235 may also be configured to manage NAT traversal problems that arise for some applications 252 running behind a NAT interface. For example, the NAT module 235 may include an Application Layer Gateway (ALG). As is known, an ALG acts as a protocol-aware firewall, monitoring traffic and updating any payload data that needs extra address translation. ALGs need to understand the higher layer protocol that they need to fix, and so each protocol with the NAT traversal problem requires a separate ALG. As an alternative, Session Traversal Utilities for NAT (STUN) (as described in RFC 5389) or Interactive Connectivity Establishment (as described in RFC 524) may be used to address NAT traversal problems. Further, for services that require a network connection to be initiated from the outside network, port forwarding can be used to forward inbound traffic for specific ports.

Further still, some network packets, e.g., Internet Control Message Protocol (ICMP) packets do not include a port number. In one embodiment, the UM Iface 205 may be configured to forward such packets to one of the processors 210, 220, or to the NAT module 235, based on values in the packets other than the port values. For packets that should be sent to either the modem processor 210 or application processor 220, an ICMP identifier value included in the ICMP header of an IP packet may be used to route the ICMP packets to the right processor. For example, the UM Iface 205 may be configured to route certain ICMP packets to the Modem processor 210. Note this approach may also be used for a UE that does not include (or is not then currently using) an NAT module 235.

For ICMP packets of the client device 250 that traverse the NAT module 235, an ICMP identifier value included in the ICMP header of the IP datagram may be used to create an entry in the translation table. Typically, an ICMP message can fit in one IP packet. However, in cases where the ICMP message is included in multiple fragments of IP datagram, since only the first fragment of the IP datagram contains the ICMP header, the first fragment is used to create the entry in the translation table. In one embodiment, the IP identification value in the IP header (as described in RFC 791) of the first fragment is tracked. If several fragments have the same IP identification value as the first fragment, NAT translates these fragments using the same translation entry.

Figure 2C:
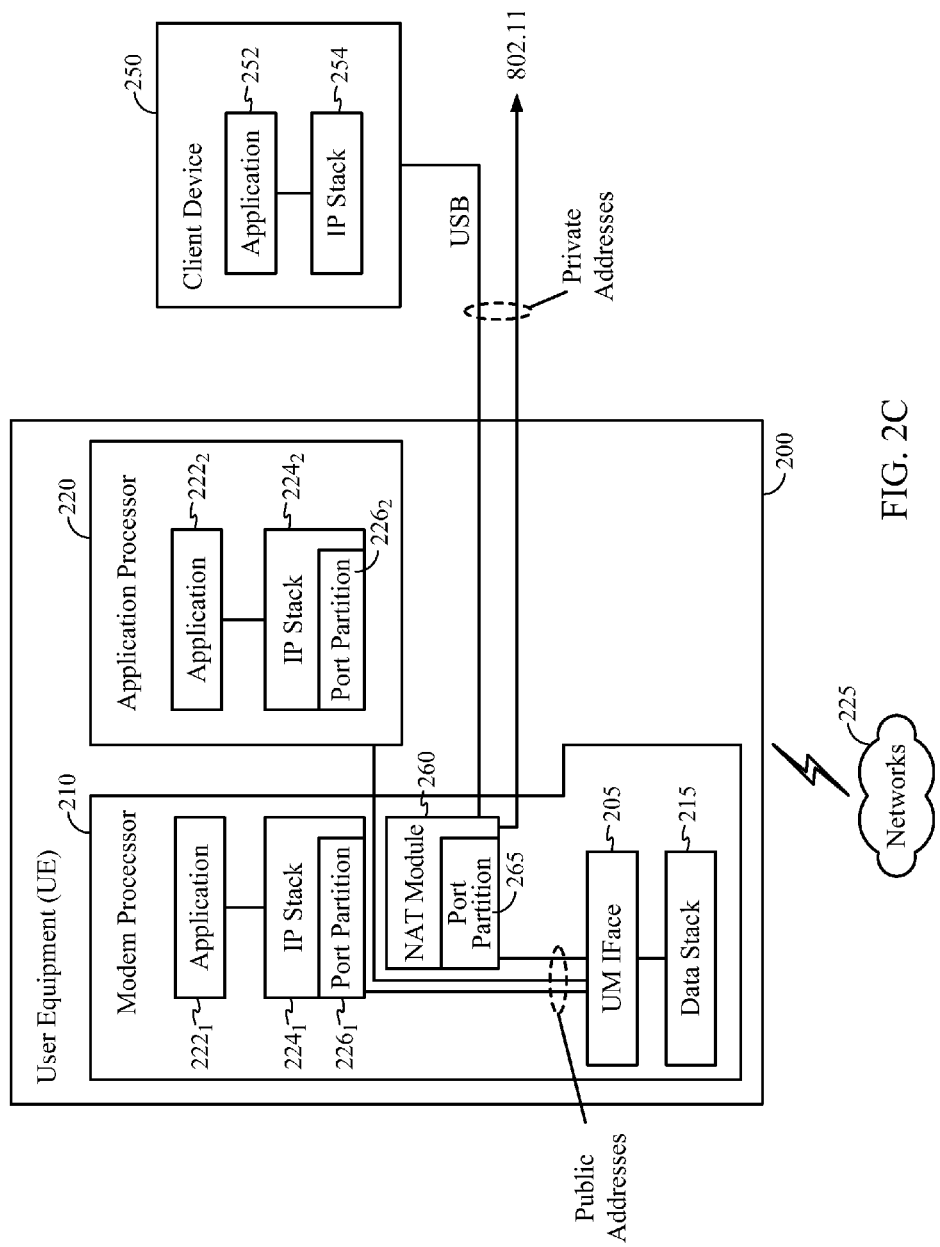

As shown in FIG. 2B, the NAT module 235 is provided by an operating system on the application processor 220. In an alternative embodiment, the NAT module may be implemented to execute on the modem processor 210. For example, FIG. 2C illustrates another functional block diagram of a UE 200, which provides multiple processing entities on UE 200 with concurrent access to a PDN connection. The embodiment shown in FIG. 2C may be used in cases where the application processor 220 cannot provide a NAT module.

Like the UE 200 shown in FIGS. 2A and 2B, the embodiment shown in FIG. 2C includes a modem processor 210 and application processor 220, described above relative to FIG. 2A. In the embodiment of FIG. 2C, however, the modem processor 210 includes a NAT module 260 and port partition 265. The NAT module 265 may function generally as was described for the NAT module 235 of FIG. 2B. Accordingly, an OS running on the modem processor 210 may assign (or receive) a port partition 265 for an external interface on the NAT module 265 and port partition $226_1$ for use by applications $222_1$ running on the modem processor 210. Like NAT module 235 in FIG. 2B, NAT module 265 may provide IP addresses to client devices connected, e.g., using a USB interface or an 802.11 connection, creating a private network behind the NAT module 265. Illustratively, the NAT module 265 assigns private IP addresses to a connected client device 250 (e.g., a laptop, tablet, or other "network aware" device) and applications 252 on the client device 250 send/receive network packets using the private address assigned to IP stack 254. Further, the NAT module 265 may translate local IP address and port pairs in network packets sent from the applications 225 to the corresponding public IP address and port pair (and vice versa), as well as address NAT traversal issues and other NAT related issues mentioned above.

Figure 2D:
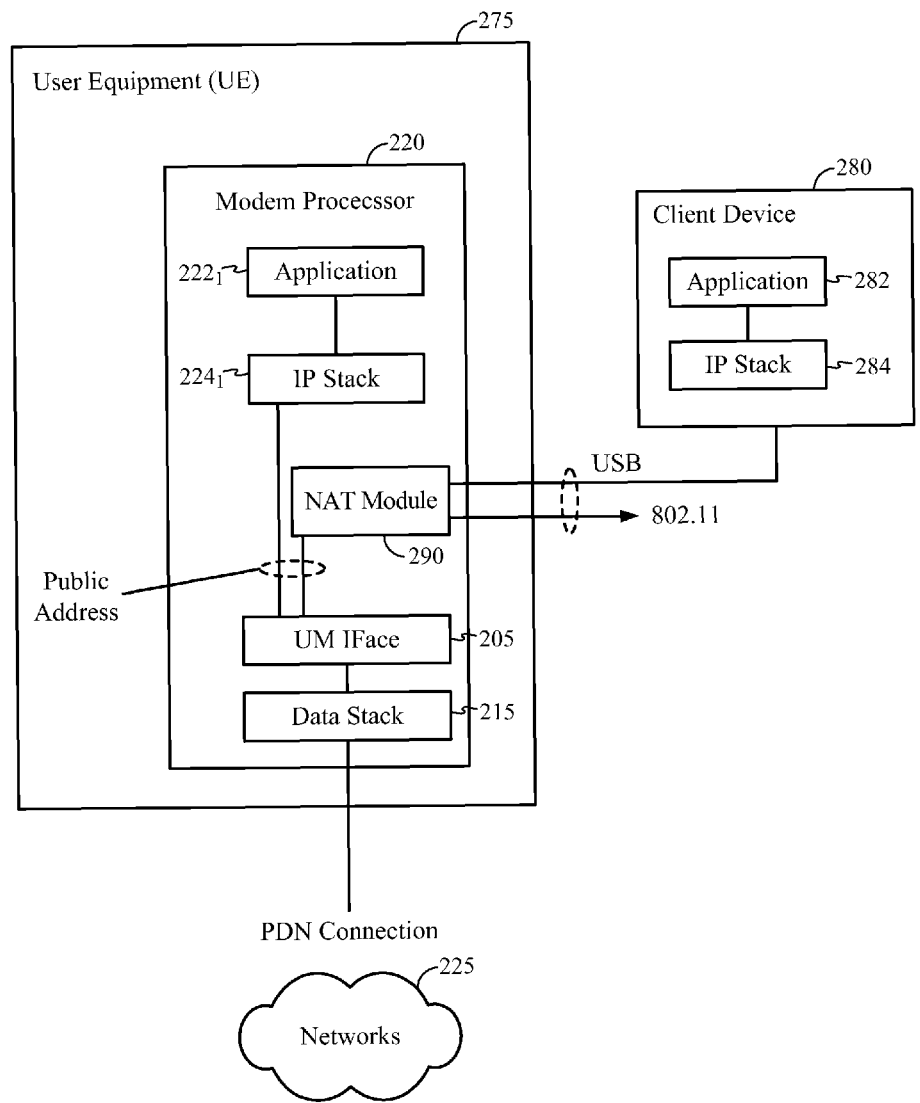

FIG. 2D illustrates another embodiment for multiple processing entities to share concurrent access to a PDN on a user equipment device. More specifically, FIG. 2D illustrates an embodiment for a UE 275 in which the application processor of UE 200 (as shown in FIGS. 2A-2C) is not present. UE 275 may be, e.g. a wireless data card or "puck" used to provide a mobile network "hotspot" for multiple client devices 280. UE 275 may also correspond to a configuration where the NAT module 290 runs on the modem processor 210, and which includes an application processor, but where no application running on the application processor needs shared access to a PDN connection.

In the embodiment of FIG. 2D, the NAT module 290 and modem processor 220 are each connected to the UM Iface 205 and share access to a public IP address assigned to each of one or more PDN connections. As described above, the UM Iface 205 may be configured to maintain a port translation table used to distinguish between network connections initiated by applications 282 (and IP stack 284) and network connections initiated by applications 222₁ (and IP stack 224₁) on the modem processor 220. As traffic is sent from either the external interface of the NAT module 290 or the IP stack 224₁ on the modem processor, entries in the translation table are created. Thereafter, traffic received by the Um Iface 205 may be forwarded as appropriate, based on the port addresses present in such network traffic. Further, some ports may be dedicated as "belonging" to the modem processor 210. And, as described for NAT modules 235 and 260 of FIGS. 2B and 2C, NAT module 290 may translate between public and private address/port pairs as well as address NAT traversal issues and other NAT related issues mentioned above.

Figure 3:
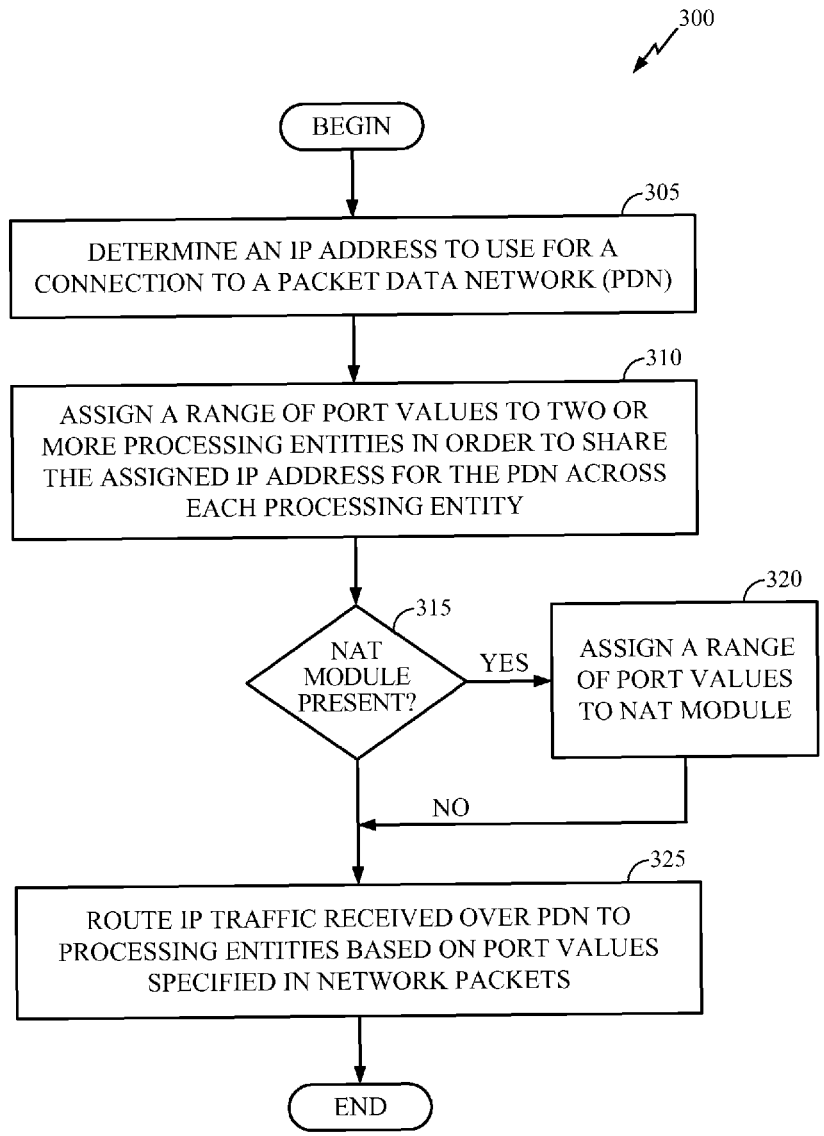
FIG. 3 illustrates example operations that may be performed by a mobile device to facilitate concurrent packet data network access by multiple processing entities on the mobile device, according to certain aspects of the present disclosure.

FIG. 3 illustrates example algorithm executed to facilitate concurrent PDN access by multiple processing entities on a UE device, according to certain aspects of the present disclosure. That is, FIG. 3 illustrates an algorithm performed by a mobile device to assign port partitions to the different processing entitles present on a mobile device, where each processing entity may need to access a PDN assigned a single IP address by a data carrier. Once assigned, the processing entities may use the port values to establish network connections with the PDN. Because the port ranges do not overlap, the different processing entity may establish network connections to the PDN using the same IP address simultaneously.

As shown, a method 300 begins at step 305, where the UE determines (or obtains) an IP address to use for a connection to a PDN. For example, the UE may interact with a Dynamic Host Control Protocol (DHCP) server inside a service provider network to obtain a network address for one or more PDNs—such an administrative PDN an IMS PDN, a general IP data network PDN, among other examples. At step 310, the UE may assign a range of port values to each processing entity (e.g., a range of port values assigned to a modem processor and an application processor, as discussed above). Doing so allows each processing entity to initiate network connections over a given PDN using distinct port values.

At step 315, if a NAT module is present on one of the processing entities, then at step 320, a range of port values is also assigned for use by the external interface of the NAT module (i.e., the interface to the IP address of a given PDN connection). In one embodiment, the port values assigned to the NAT module may be a subset of the port values assigned to the processing entity implementing the NAT module. However, other approaches for determining a range of port values for the processing entities and NAT module may be used as well.

Following step 315 (or 320 if a NAT module is present), at step 325, applications running on the processing entities of the UE, as well as devices tethered to the UE using private addresses assigned by the NAT module, may route network packets to the PDN connection concurrently.

Figure 4:
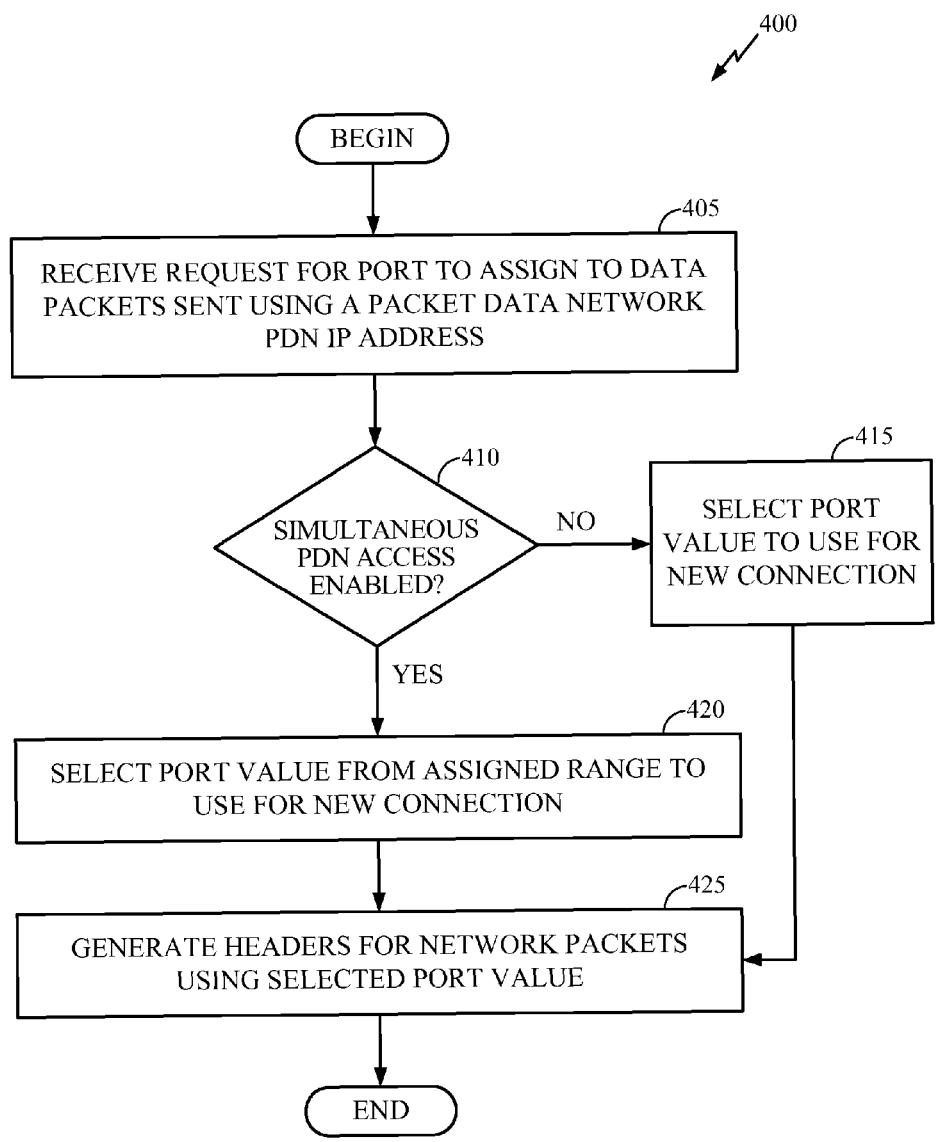
FIG. 4 illustrates example operations that may be performed by a processing entity on a mobile device to assign a port value to a network connection on a packet data network shared concurrently by multiple processing entities on the mobile device, according to certain aspects of the present disclosure.

As new connections are initiated by the processing entities (and/or NAT module), port values for a given network connection are selected from the port partition assigned to a given processing entity (or the external interface of the NAT module) and added to a port translation table used to forward incoming traffic to the appropriate processing entity (or to the external interface of the NAT module). For example, FIG. 4 illustrates an algorithm that may be performed by a processing entity on a UE to assign a port value to a network connection to a PDN shared concurrently by multiple processing entities, according to certain aspects of the present disclosure.

As shown, a method 400 begins at step 405, where an application running on one of the processing entities requests a port value to use for data packets sent using an IP address for a given PDN. For example, a modem processor or an application processor may each have been assigned a non-overlapping range of ports to use to connect the given PDN. At step 410, if simultaneous PDN access is not enabled (or needed, as in the UE configuration shown in FIG. 3D), then a port is selected for the network connection and network headers are generated using the selected port value (step 425). However, in cases where the simultaneous access to a given PDN is enabled, then at step 420, the processing entity selects a port value to assign to a network connection from a port partition assigned to that processing entity (or assigned to a NAT module). Again, because the port partitions do not overlap, the different processing entity may establish network connections to the PDN using the same IP address simultaneously.

Once a port value is assigned, an IP stack on the processing entity may generate network headers for packets sent to the PDN which use the selected port value (step 420). Again, where multiple processing entities are included in the UE, selecting a port value selected from a distinct port partition allows multiple such processing entities (and and NAT module) to share concurrent access to a given PDN connection. In one embodiment, a UM Iface connected to each processing entity (and the NAT module, if present) may maintain a translation table used to forward network packets sent to the IP address associated with the given PDN connection based on the port values indicated therein.

Figure 5:
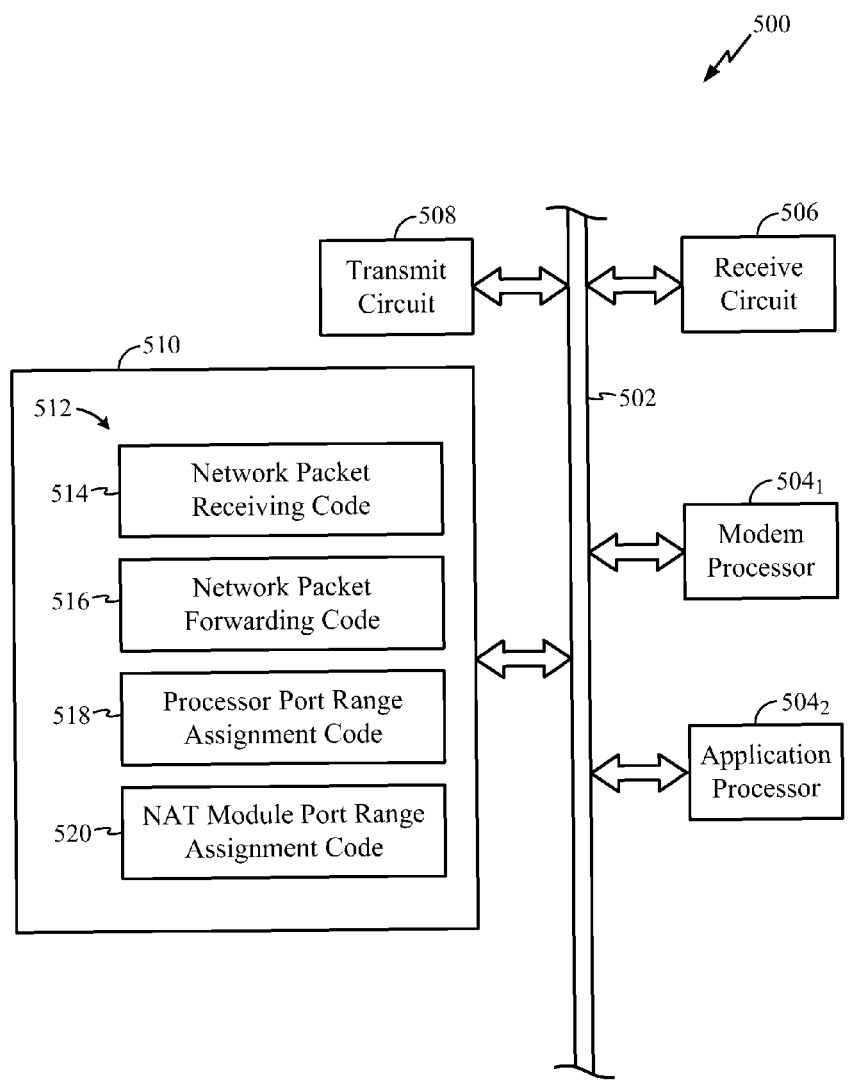
FIG. 5 shows a block diagram of a base station and a mobile device.

FIG. 5 shows part of a hardware implementation of an apparatus 500. More specifically, FIG. 5 illustrates an example hardware implementation which can support the functional configurations for sharing a PDN connection illustrated in FIGS. 2A-2D. In FIG. 5, the circuit apparatus is signified by the reference numeral 500 which includes circuitry and may be one configuration of a UE 120. In this specification and the appended claims, it should be clear that the term "circuitry" is construed as a structural term and not as a functional term. For example, circuitry can be an aggregate of circuit components, such as a multiplicity of integrated circuit components, in the form of processing and/or memory cells, units, blocks and the like, such as shown and described in FIG. 5.

The apparatus 500 comprises a central data bus 502 linking several circuits together. The circuits include one or more processors 504, a receive circuit 506, a transmit circuit 508, and memory 510. The memory 510 is in electronic communication with the processor 504, i.e., the processors $504_{1-2}$ can read information from and/or write information to the memory 510.

Illustratively, the apparatus 500 includes a modem processor $504_1$ and an application processor $504_2$. The modem processor $504_1$ may be configured to execute applications related to the operation of the apparatus 500, e.g., applications configured to configure a SIM card on the apparatus or to decode GPS signals received by the apparatus to determine the location thereof. Such applications may depend on a first IP stack managed by code running on the modem processor $504_2$ to send and receive network packets. The application processor $504_2$ may be configured to execute other applications, e.g., user applications such as a web browser, email client, an OTADM client, or mapping software. Such applications may depend on a second IP stack managed by code running on the application processor $504_2$ to send and receive network packets.

Each processor $504_{1-2}$ may be a general purpose processor, a central processing unit (CPU), a microprocessor, a digital signal processor (DSP), a controller, a microcontroller, a state machine, an application specific integrated circuit (ASIC), a programmable logic device (PLD), a field programmable gate array (FPGA), etc. The processor 504 may include a combination of processing devices, e.g., a combination of a DSP and a microprocessor, a plurality of microprocessors, one or more microprocessors in conjunction with a DSP core, or any other such configuration.

The receive circuit 506 and the transmit circuit 508 can be connected to an RF (Radio Frequency) circuit, but that is not shown in the drawing. The receive circuit 506 may process and buffer received signals before sending the signals out to the data bus 502. On the other hand, the transmit circuit 508 may process and buffer the data from the data bus 502 before sending the data out of the device 500. The processor 504 may perform the function of data management of the data bus 502 and further the function of general data processing, including executing the instructional contents of the memory 510.

Instead of separately disposed as shown in FIG. 5, as an alternative, the transmit circuit 508 and the receive circuit 506 may be part of the processor 504.

The memory unit 510 includes a set of instructions generally signified by the reference numeral 512. The instructions 512 may be executable by the processor 504 to implement the methods described herein. The instructions 512 may include code 514 for receiving a network frame from a MAC layer having an address/port combination. The instructions 512 may also include code 516 for forwarding the received frame to IP stacks on different processors on the apparatus 500. The instructions 512 may further include code 518 for assigning a non-overlapping port range for different processors on the apparatus 500. The instructions 512 may also include code 520 for assigning a port range for use by an external interface of a NAT module.

The instructions 512 shown in the memory 510 may comprise any type of computer-readable statement(s). For example, the instructions 512 in the memory 510 may refer to one or more programs, routines, sub-routines, modules, functions, procedures, data sets, etc. The instructions 512 may comprise a single computer-readable statement or many computer-readable statements.

The memory 510 may be a RAM (Random Access Memory) circuit. The memory 510 can be tied to another memory circuit (not shown) which can either be of the volatile or nonvolatile type. As an alternative, the memory 510 can be made of other circuit types, such as an EEPROM (Electrically Erasable Programmable Read Only Memory), an EPROM (Electrical Programmable Read Only Memory), a ROM (Read Only Memory), an ASIC (Application Specific Integrated Circuit), a magnetic disk, an optical disk, and others well known in the art. The memory 510 may be considered to be an example of a computer-program product that comprises a computer-readable medium with instructions 512 stored therein.

Advantageously, embodiments presented in this disclosure provide techniques for sharing a common IP address for a packet data network (PDN) among multiple processing entities on a UE device. In one embodiment, the processing entities are each assigned a non-overlapping range of port values, referred to as a port partition, to use for network connections to the PDN established by applications running on a given processing entity. Doing so provides the processing entities with concurrent access to the single PDN connection. Further, in certain embodiments, a NAT module may be used to provide private IP addresses to the applications running on any tethered devices. If present, the NAT module may also be assigned a distinct range of ports (relative to the ranges assigned to other processing entities) to use to forward data packets to/from the PDN and private addresses behind the NAT module.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein but is to be accorded the widest scope consistent with the principles and novel features disclosed herein.

The invention claimed is:

1. A method for wireless communications, comprising:
   determining a network address for a user equipment (UE) to connect to a packet data network;
   assigning, to a first processing entity on the UE, a first port partition to use with the network address for connections to the packet data network initiated by applications executing on the first processing entity; and
   assigning, to a second processing entity on the UE, a second port partition to use with the network address for connections to the packet data network initiated by applications executing on the second processing entity, wherein the first and second port partitions do not overlap.

2. The method of claim 1, wherein the first processing entity on the UE is a modem processor which includes a first Internet protocol stack and wherein the second processing entity on the UE is an application processor which includes a second Internet protocol stack.

3. The method of claim 1, further comprising:
   assigning, to a network address translation module on the UE, a third port partition to use for network connections to the packet data network initiated by applications connected to the packet data network by an external interface of the network address translation module, wherein the third port partition does not overlap with either the first port partition or the second port partition.

4. The method of claim 3, wherein the network address translation module is implemented on either the first processing entity or the second processing entity.

5. The method of claim 3, further comprising:
receiving, by the UE, a network packet having a destination address matching the network address assigned to the UE for the packet data network connection and having a port value; and
forwarding the packet to one of the first processing entity, the second processing entity, and the external interface of the network address translation module based on the port value.

6. The method of claim 1, further comprising:
receiving, by the UE, a network packet having a destination address matching the network address assigned to the UE for the packet data network connection and having a port value; and
forwarding the packet to one of the first processing entity and the second processing entity based on the port value.

7. A method for wireless communications, comprising:
determining a network address for a mobile device to connect to a packet data network;
receiving, by the mobile device, a network packet having a destination address matching the network address of the packet data network and having a port value; and
selecting between at least a first processing entity on the mobile device and an external interface of a network address translation module on the mobile device to forward the network packet, based on the port value.

8. The method of claim 7, wherein the first processing entity is a modem processor on the mobile device and wherein the modem processor executes one or more applications and includes a first Internet protocol stack.

9. The method of claim 7, further comprising:
receiving, from a client device behind the network address translation module, a request to create a network connection to a host reachable over the packet data network; and
assigning a port value to the network connection, wherein the port value is selected so as to not conflict with any port value in use by the network address translation module or the first processing entity for connections to the packet data network.

10. A method for wireless communications, comprising:
receiving, by a first processing entity on a user equipment (UE), a request to establish a connection to a packet data network; and
assigning a port value to the connection, wherein the port value is selected from a first port range, wherein the first port range does not overlap with a second port range used by a second processing entity on the UE.

11. The method of claim 10, wherein the first port range and the second port range do not overlap with a third port range used by a network address translation module implemented by one of the first processing entity and the second processing entity.

12. An apparatus for wireless communications, comprising:
means for determining a network address for a user equipment (UE) to connect to a packet data network;
means for assigning, to a first processing entity on the UE, a first port partition to use with the network address for connections to the packet data network initiated by applications executing on the first processing entity; and
means for assigning, to a second processing entity on the UE, a second port partition to use with the network address for connections to the packet data network initiated by applications executing on the second processing entity, wherein the first and second port partitions do not overlap.

13. The apparatus of claim 12, wherein the first processing entity on the UE is a modem processor which includes a first Internet protocol stack and wherein the second processing entity on the UE is an application processor which includes a second Internet protocol stack.

14. The apparatus of claim 12, further comprising:
means for assigning, to a network address translation module on the UE, a third port partition to use for network connections to the packet data network initiated by applications connected to the packet data network by an external interface of the network address translation module, wherein the third port partition does not overlap with either the first port partition or the second port partition.

15. The apparatus of claim 14, wherein the network address translation module is implemented on either the first processing entity or the second processing entity.

16. The apparatus of claim 14, further comprising:
means for receiving, by the UE, a network packet having a destination address matching the network address assigned to the UE for the packet data network connection and having a port value; and
means for forwarding the packet to one of the first processing entity, the second processing entity, and the external interface of the network address translation module based on the port value.

17. The apparatus of claim 12, further comprising:
means for receiving, by the UE, a network packet having a destination address matching the network address assigned to the UE for the packet data network connection and having a port value; and
means for forwarding the packet to one of the first processing entity and the second processing entity based on the port value.

18. An apparatus for wireless communications, comprising:
means for determining a network address for a to connect to a packet data network;
means for receiving, by the mobile device, a network packet having a destination address matching the network address of the packet data network and having a port value; and
means for selecting between at least a first processing entity on the mobile device and an external interface of a network address translation module on the mobile device to forward the network packet, based on the port value.

19. The apparatus of claim 18, wherein the first processing entity is a modem processor on the mobile device and wherein the modem processor executes one or more applications and includes a first Internet protocol stack.

20. The apparatus of claim 18, further comprising:
means for receiving, from a client device behind the network address translation module, a request to create a network connection to a host reachable over the packet data network; and
means for assigning a port value to the network connection, wherein the port value is selected so as to not conflict with any port value in use by the network address translation module or the first processing entity for connections to the packet data network.

21. An apparatus for wireless communications, comprising:
- means for receiving, by a first processing entity on a user equipment (UE), a request to establish a connection to a packet data network; and
- means for assigning a port value to the connection, wherein the port value is selected from a first port range, wherein the first port range does not overlap with a second port range used by a second processing entity on the UE.

22. The apparatus of claim 21, wherein the first port range and the second port range do not overlap with a third port range used by a network address translation module implemented by one of the first processing entity and the second processing entity.

23. An apparatus, comprising:
circuitry configured to:
- determine a network address for a user equipment (UE) to connect to a packet data network;
- assign, to a first processing entity on the UE, a first port partition to use with the network address for connections to the packet data network initiated by applications executing on the first processing entity; and
- assign, to a second processing entity on the UE, a second port partition to use with the network address for connections to the packet data network initiated by applications executing on the second processing entity, wherein the first and second port ranges do not overlap.

24. An apparatus, comprising:
circuitry configured to:
- determine a network address for a mobile device to connect to a packet data network;
- receive, by the mobile device, a network packet having a destination address matching the network address of the packet data network and having a port value; and
- select between at least a first processing entity on the mobile device and an external interface of a network address translation module on the mobile device to forward the network packet, based on the port value.

25. An apparatus, comprising:
circuitry configured to:
- receive, by a first processing entity on a user equipment (UE), a request to establish a connection to a packet data network; and
- assign a port value to the connection, wherein the port value is selected from a first port range, wherein the first port range does not overlap with a second port range used by a second processing entity on the UE.

26. A computer-program product comprising a non-transitory computer-readable medium having instructions stored thereon, the instructions executable by one or more processors for:
- determining a network address for a user equipment (UE) to connect to a packet data network;
- assigning, to a first processing entity on the UE, a first port partition to use with the network address for connections to the packet data network initiated by applications executing on the first processing entity; and
- assigning, to a second processing entity on the UE, a second port partition to use with the network address for connections to the packet data network initiated by applications executing on the second processing entity, wherein the first and second port ranges do not overlap.

27. A computer-program product comprising a non-transitory computer-readable medium having instructions stored thereon, the instructions executable by one or more processors for:
- determining a network address for a mobile device to connect to a packet data network;
- receiving, by the mobile device, a network packet having a destination address matching the network address of the packet data network and having a port value; and
- selecting between at least a first processing entity on the mobile device and an external interface of a network address translation module on the mobile device to forward the network packet, based on the port value.

28. A computer-program product comprising a non-transitory computer-readable medium having instructions stored thereon, the instructions executable by one or more processors for:
- receiving, by a first processing entity on a user equipment (UE), a request to establish a connection to a packet data network; and
- assigning a port value to the connection, wherein the port value is selected from a first port range, wherein the first port range does not overlap with a second port range used by a second processing entity on the UE.

* * * * *